N. SAWICKI.
HORSESHOE.
APPLICATION FILED NOV. 7, 1910.
1,000,951.
Patented Aug. 15, 1911.
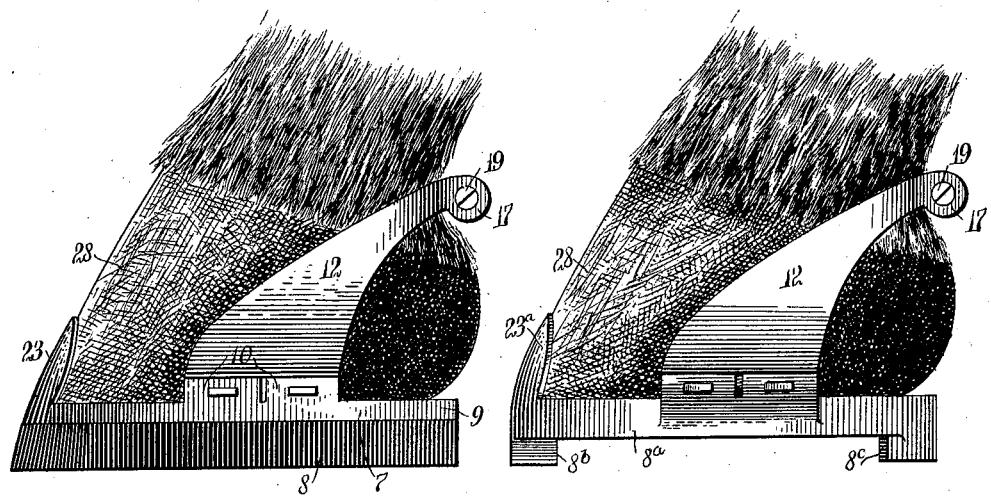
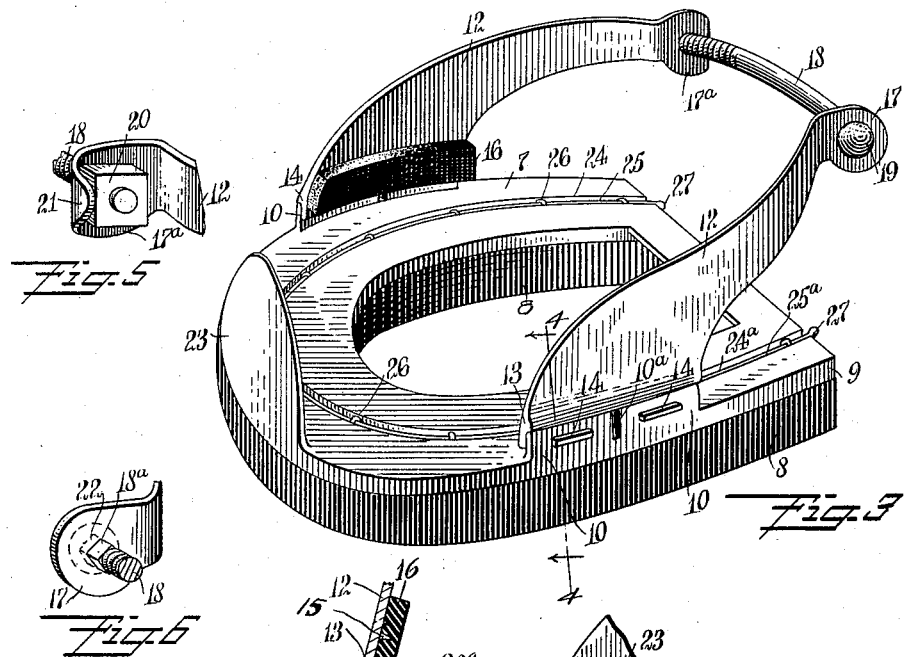
WITNESSES:
E. G. Bromley
Walton Harrison
INVENTOR
Norbert Sawicki
BY
Mundo
ATTORNEYS

UNITED STATES PATENT OFFICE.

NORBERT SAWICKI, OF NEW YORK, N. Y., ASSIGNOR OF ONE-THIRD TO LADISLAUS W. SCHWENK, OF BROOKLYN, NEW YORK.

HORSESHOE.

1,000,951.           Specification of Letters Patent.      Patented Aug. 15, 1911.

Application filed November 7, 1910. Serial No. 590,990.

*To all whom it may concern:*

Be it known that I, NORBERT SAWICKI, a subject of the Czar of Russia, and a resident of the city of New York, borough of Manhattan, in the county and State of New York, have invented a new and Improved Horseshoe, of which the following is a full, clear, and exact description.

My invention relates to horseshoes, my more particular purpose being to provide a horseshoe to be connected with the horse's foot without the aid of nails or other similar fastenings, and also without the necessity for any part binding tightly upon any sensitive portion of the hoof.

In this connection it may be noted that the use of nails in horseshoes is not only injurious to the hoofs, but tends also in the course of time to render the hoof unfit for holding the shoe. Moreover, the use of nails is dangerous because a nail may split and a splinter from it may enter some part of the horse's foot, thereby causing lameness.

I seek to provide a shoe which is not only free from nails and from destructive fastening members of other kinds, but is easily and quickly applied, is secure while in use upon the foot, and yet so arranged as to exert no undue pressure upon the upper and thinner portion of the hoof.

Reference is to be had to the accompanying drawings forming a part of this specification, in which similar characters of reference indicate corresponding parts in all the figures.

Figure 1 is a side elevation showing a form of my shoe, having a rubber tread member and applied to a horse's foot; Fig. 2 is an elevation showing a second form of the shoe, the tread member being in this instance made of iron; Fig. 3 is a perspective of the form appearing in Fig. 1, but removed from the foot; Fig. 4 is an enlarged section on the line 4—4 of Fig. 3, looking in the direction of the arrow; Fig. 5 is an enlarged fragmentary perspective showing one end of the retaining bolt and the nut secured thereupon; and Fig. 6 is a fragmentary perspective showing the other end of the retaining bolt and parts immediately contiguous to the same.

A metallic plate 7 having generally a horseshoe form is mounted upon a rubber base 8 so as to form a capping for the same. The plate 7 is provided with a downwardly turned flange 9 and with ears 10 integral with said flange and extending upwardly. The ears 10 are separated by a slot $10^a$ and are severally provided with slots 11. At 12 are two spring straps each provided with a shoulder 13 of a length approximating the aggregate length of two of the ears 10 and shaped to rest upon the latter. The strap 12 is further provided with hooks 14 integral with it, these hooks being of proper proportions to fit neatly into the slots 11. Mounted upon the straps 12 and extending inwardly therefrom are spikes 15. Impaled upon these spikes and pressed tightly against the lower inner surfaces of the straps 12 are two cushions 16 made of rubber or other soft material.

The upper or smaller ends of the straps 12 are provided with eyes 17, $17^a$ integral therewith. A bolt 18 extends through both eyes 17, $17^a$ and is provided with a head 19. A nut 20 is fitted upon one end of the bolt 18, which is threaded for this purpose. The eye $17^a$ is provided with a tongue 21 integral with it, this tongue being bent as indicated in Fig. 5. The bolt 18 is further provided with a square neck $18^a$ and the opening 22 in the eye 17 (see Fig. 6) is made square for the purpose of receiving the neck $18^a$.

The plate 7 is provided with an upturned portion 23 integral with it, which I designate as a "toe plate". The plate 7 is further provided with two channels 24, $24^a$ and normally resting within these channels are two slightly curved needles 25, $25^a$. A number of eyes 26 extend through slots in the bottom of the channels 24, $24^a$ and are provided with anchorages $26^a$. When the plate 7 rests upon the base portion 8 so that the tops of the eyes 26 extend well up into the channels 24, $24^a$ and substantially flush with the tops thereof, the needles 25, $25^a$ may be inserted or removed. When inserted they hold the plate 7 and the base 8 rigidly together. The needles 25, $25^a$ are provided with heads 27 whereby they may be drawn out lengthwise or re-inserted, as desired. The horse's hoof is shown at 28.

In the form shown in Fig. 2, the construction is the same as that just described, with the exception that the principal body portion 8ª of the shoe is made in a single piece (metal) and is provided with calks 8ᵇ, 8ᶜ, the toe plate 23ª being integral with the body portion.

The operation of my device is as follows: In order to use the shoe the two straps 12 are so manipulated by hand as to insert the hooks 14 through the slots 11, as above described. The horse's foot is next inserted and the eyes 17, 17ª forced toward each other. The retaining bolt 18 is next inserted through both eyes and the nut 20 secured upon the threaded end of this bolt.

In order to remove the shoe, the eyes 17, 17ª are pressed toward each other, thus binding the springs 12 slightly, so that the nut 20 clears the ear 17ª and the tongue 21. This done, the nut is readily unscrewed and the bolt 18 taken out, wherefrom the shoe drops off. When the shoe is in use the cushions 16, being of resilient material, press gently in opposite directions upon the lower portion of the hoof which is very tough and resistive to pressure. The straps 12, however, do not come into direct engagement with the hoof or with any part of the foot. Neither does the retaining bolt 18 touch the foot. On the contrary it bears off slightly away from the foot. There is thus a clear space from one cushion 16 clear around and back to the opposite cushion 16, and in this clear space nothing presses upon the foot or any part thereof. It will also be noted that the straps 12 being of spring metal tend to distribute equally such strain as is placed upon the hoof by aid of the cushions 16. Also that the straps 12 act to some extent as levers and force the cushions 16 firmly into engagement with the portions of the hoof with which they are associated.

I do not limit myself to the precise construction here shown and described, as the same may be varied within proper limits without departing from the spirit of my invention.

Having thus described my invention, I claim as new and desire to secure by Letters Patent:

1. In a horseshoe, the combination of a body portion provided with ears and with slots extending through said ears, straps provided with shoulders for resting upon said ears and further provided with portions for extending through said slots, and a retaining member connected at one of its ends with one of said straps and at its opposite end with another of said straps.

2. In a horseshoe, the combination of a body portion, straps of spring metal mounted thereupon and extending upwardly and backward therefrom, a retaining member engaging said straps for the purpose of securing the shoe upon a horse's foot, and cushions connected with said straps and disposed close to said body portion for the purpose of holding the upwardly and backwardly extending portions of said straps out of engagement with said foot.

3. The combination of a body member provided with portions extending upwardly therefrom, straps detachably connected with said portions and provided with ends, cushions mounted upon said straps and located adjacent to said portions, so as to press against the horse's hoof and thus leave said ends of said straps free of said hoof, and a fastening member extending across from the end of one strap to the end of another strap.

In testimony whereof I have signed my name to this specification in the presence of two subscribing witnesses.

NORBERT SAWICKI.

Witnesses:
ARTHUR GABRYEL,
ENGELBERT ROMEDAY.

---

Copies of this patent may be obtained for five cents each, by addressing the "Commissioner of Patents, Washington, D. C."